Figure 1:
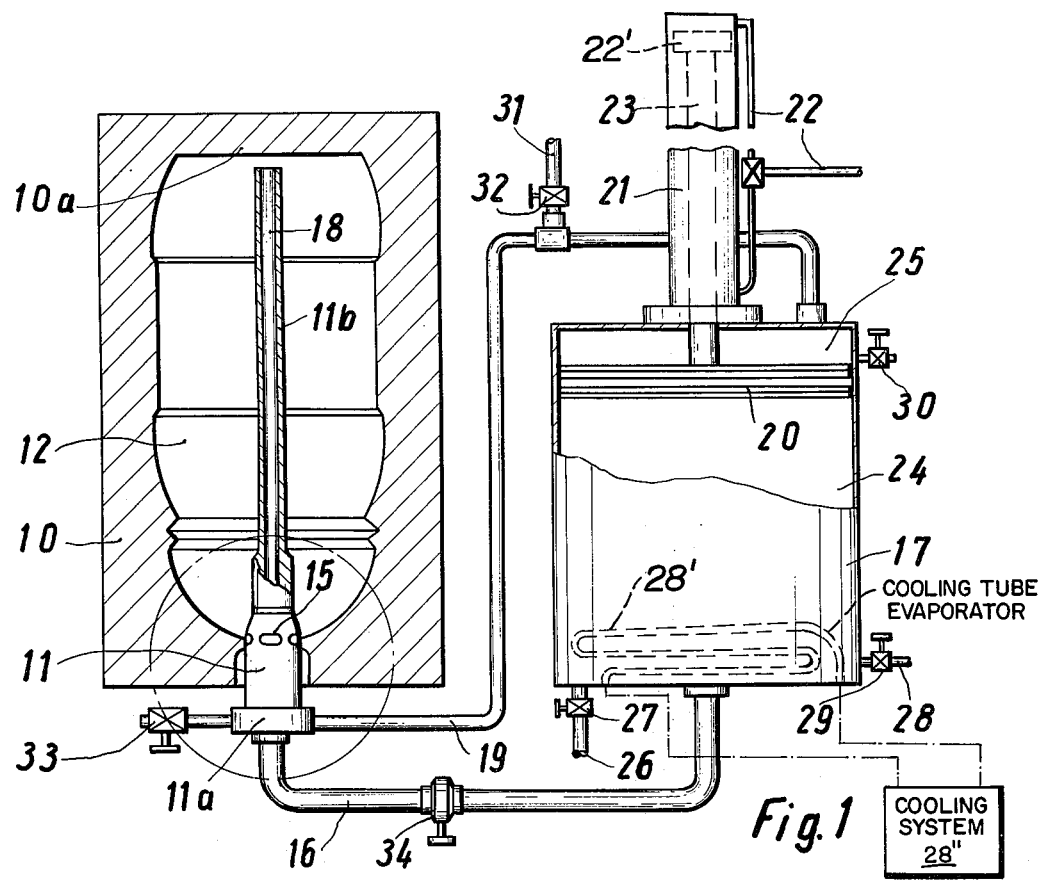

United States Patent [19]

Mrusek et al.

[11] 3,910,746
[45] Oct. 7, 1975

[54] APPARATUS FOR MANUFACTURING HOLLOW ARTICLES OF THERMOPLASTIC RESIN BY BLOWING

[75] Inventors: Wilfried Mrusek, Bellheim; Kalman Körmendi, Karlsruhe, Baden, both of Germany

[73] Assignee: Elbatainer, Kunststoff- und Verpackungs- Gesellschaft m.b.H., Ettlingen, Germany

[22] Filed: Dec. 20, 1973

[21] Appl. No.: 426,913

[30] Foreign Application Priority Data

Jan. 4, 1973 Germany............................ 2300234

[52] U.S. Cl...................... 425/387 B; 425/DIG. 208
[51] Int. Cl.².......................................... B29D 23/03
[58] Field of Search......... 425/242 B, 326 B, 387 B, 425/DIG. 208; 222/136, 137, 331

[56] References Cited
UNITED STATES PATENTS
3,114,596  12/1963  Wechsler et al........... 425/DIG. 208

Primary Examiner—Francis S. Husar
Assistant Examiner—R. J. Charvat
Attorney, Agent, or Firm—Ernest G. Montague; Karl F. Ross; Herbert Dubno

[57] ABSTRACT

An apparatus for manufacturing hollow articles from thermoplastic resin with a blow mold wherein a blowing and filling mandrel is disposed within the blow mold upon being introduced from a bottom of the latter and extends close to the top closure edges of the blow mold, the mandrel having inlet and outlet channels communicating with lower and upper regions inside the hollow article to be produced for blowing air and for coolant, respectively. A storage container has a coolant supply region and an air space region, and feedlines for the blowing air and for the coolant, respectively, and is connected over separate paths between the region of the coolant supply and to the air space region, respectively and the upper and lower regions of the hollow article.

7 Claims, 2 Drawing Figures

U.S. Patent Oct. 7, 1975 3,910,746

APPARATUS FOR MANUFACTURING HOLLOW ARTICLES OF THERMOPLASTIC RESIN BY BLOWING

The present invention relates to a process and an apparatus for the manufacture of hollow articles of thermoplastic resin by a blowing process from preforms or parisons, which are of heated plastically deformable material in the molding chamber of a closed blow mold, the hollow articles being cooled by forcing a liquid coolant, for instance water, into the interior thereof.

In the manufacture of hollow articles which are expanded to predetermined dimensions and contours by the blowing process, it is necessary to allow the plastic wall thereof which, after the blowing process, still retains considerable plasticization heat to cool down sufficiently, while maintaining a supporting air pressure so that the hollow body can be removed from the mold without collapse of the wall. Because of the considerable heating of the walls of the blow mold, the plastic cools down very slowly, and to the present such cooling required a nonproductive stand-by time in every blowing process and greatly limited production of the blowing plant. In order to decrease these stand-by times and to be able to use the blowing machines more productively there have frequently been used heretofore water-cooled blow molds from which the heat taken up is removed by a system which continuously pumps water through the walls of the blow mold. This indirect cooling of the hollow articles, however, did not lead to any substantial reduction in the stand-by time.

In order to intensify the cooling action it has already been proposed to cool the wall of the hollow article directly by injecting a gaseous coolant or a liquid coolant mixed with air into the interior of the hollow article. These proposals also failed to give the desired result unless expensive coolants were used. The use of these coolants, however, makes the cooling and thus the entire manufacturing process much too expensive and thus makes production as a whole uneconomical. These proposals did not result in any practical solution, particularly for the manufacture of large size, relatively thick-walled hollow articles, since there is the danger, in these cases, of rapid cooling of separate zones which results in stresses in the wall material which must be avoided.

It has also already been proposed to spray cooling water briefly through a channel of the blowing mandrel into the hollow article against the wall thereof and thereupon to dry the sprayed wall of the hollow article by again injecting air under pressure (U.S. Pat. No. 2,348,738). This proposal also — even in case of hollow articles of small size — has inherent in it the danger of irregular cooling of the surface, so that the aforementioned stresses may develop in the wall of the hollow article. Depending on the type of plastic, the wall thickness and the purpose of use of the hollow articles, these stresses have a greater or lesser detrimental effect, predominantly corrosive, upon the further use of these hollow articles. In addition, large hollow articles with correspondingly thick walls still require cooling and stand-by times which are far too long for the expense required for this technique to be worthwhile.

It is an object of the invention, therefore, to provide an improved apparatus for the manufacture of hollow plastic articles by the blowing process, whereby the blowing plants can be more economically utilized with inclusion of an improved cooling system and which, while avoiding the disadvantages described above, is suitable for the manufacture of hollow articles of any desired size and different wall thicknesses. Another object is to provide an improved apparatus which can be installed relatively easily in every blow plant.

According to the invention, after each blowing, the blow pressure is retained in the corresponding hollow article, during which time the liquid coolant is introduced into the interior of the hollow article from the bottom of the blowing mold with simultaneous displacement of the blow air with a pressure which is higher than the blowing pressure. After the hollow article has been at least approximately completely filled with the liquid coolant, it is emptied again by a change in direction of the flow of air and coolant under the force of suction and pressure and then vented to external atmospheric pressure and removed from the mold.

In this way there is provided a simple, practical and economically feasible method for rapid operation of the blowing apparatus. The complete inner flooding of the hollow article with liquid which rises uniformly under internal pressure results in a relatively rapid and intensive cooling of the entire wall of the hollow article so that no regions of stress can occur. Furthermore, the stand-by time after each blowing process is limited essentially to the relatively short period of time which is necessary for the flooding and emptying of the inside of the hollow article. These operations can be carried out in rapid sequence.

In accordance with a feature of the present invention, the coolant is contained in a supply container which is in pressure equilibrium with the inside of the hollow article and for each cooling process delivers liquid to and receives liquid from the hollow article. This permits a rapid flooding and removal and thus cooling of the hollow article which leads to a considerable increase in production and to a more economical manufacture of the hollow article than heretofore. In addition, it makes it possible to use relatively simple apparatus parts and a cheap but continuously recoverable coolant.

For the carrying out of the process described, the blowing plant has a blowing and filling mandrel introduced from the bottom of the mold and extending to just below the top closing edges of the mold, the mandrel having inlet and outlet channels emptying into the upper and lower regions of the interior of the hollow article respectively for the blast air and for the coolant, the feedlines of the blow air and the coolant being connected over separate paths with the storage container in the region of the coolant supply and in the region of an air space. This storage container is preferably cylindrical and has a partition wall of piston-like shape which is suspended for movement in its axial direction, the partition subdividing the storage container into a chamber containing the coolant and on the other hand a chamber receiving the blast air. The partition of the storage container is preferably connected with the piston rod of a drive unit, for instance a hydraulic cylinder.

Any blowing plant can be equipped without great expense with such an apparatus and thereby have its production capacity increased. It makes possible a rapid cooling of the article and allows the use of a specific quantity of a relatively cheap coolant such as water which, depending on the requirements and the construction of the apparatus, can be alternated between the blow mold and the storage container either entirely without or with only slight losses. In this connection the heat absorbed by the coolant is removed in the storage container either by a built-in heat-exchange device of a known cooling plant or, if a predetermined temperature is exceeded, by the disposal of a suitable quantity of coolant which is replaced by cold coolant which lowers the inherent temperature as a whole.

Figure 2:
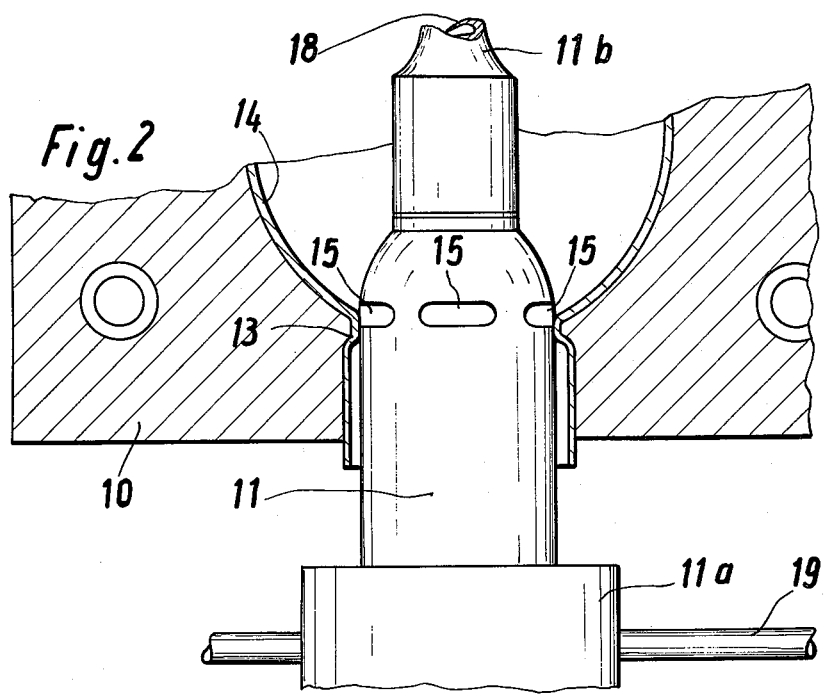

These and other objects will become apparent from the following detailed description of the present invention in connection with the accompanying drawing in which:

FIG. 1 is a side view of a blow mold of a conventional blow-molding plant provided with a flooding and coolant-removal device, seen partially in section, according to the invention, and FIG. 2 shows a portion of FIG. 1 on a larger scale.

FIG. 1 shows a known blow-molding plant, which is therefore not shown in its entirety, which has one-half of a blow mold 10 which can be closed below a tube extruder (not shown) around a of a parison which emerges from the extruder nozzle of said extruder at plasticizing heat. In the vertical closing plane of the blow mold there is located a blowing and filling mandrel 11 which extends from the bottom of the blow mold within its mold cavity 12 to just below the upper closing edges 10a.

As shown in FIG. 2, the blowing and filling mandrel 11 is tightly surrounded at its lower region by the lower closing edges 13 of the blow mold with the interposition of the lower end section of the plastic tube or parison shown as an already shaped hollow article 14. Directly above these closing edges 13, a plurality of flooding and removal channels 15 open from the blowing and filling mandrel into the mold cavity 12 inside the bottom of the hollow article 14.

These channels lead below the blow mold into a manifold 11a and are connected via a coolant conduit 16 with the inside of a storage container 17 from the bottom of which the conduit discharges into the container (FIG. 1).

Within the mold cavity 12, the blowing and filling mandrel 11 has a riser tube 11b which extends to just below the top closing edges 10a of the blowing mold. This riser tube contains a blow air channel 18 which thus also discharges just below the said top closing edges into the mold cavity within the article 14. Below the blow mold, this blowing air channel 18 is connected with a blowing-air conduit 19 which discharges from the top of the storage container 17 into its interior.

The storage container 17 is a closed cylinder with a vertical axis. Within the container 17 there is, adapted to its cross section, a partition 20 which lies in the manner of a piston tightly against the cylindrical inner wall of the storage container and is movable in the axial direction of the container. On the top of the storage container there is centrally located a hydraulic cylinder 21 with oil pressure lines 22 and a drive piston 22' whose piston rod 23 is connected with the partition 20. The partition divides the inside of the storage container into two chambers 24 and 25. The chamber 24 which lies below the partition contains a supply of coolant, while the chamber 25 formed above it serves to receive the blow air.

In the lower region of the coolant chamber 24 there communicates with the storage container 17 a feed pipe 26 having an inlet valve 27 and an outlet pipe 28 having an outlet valve 29 whereby the coolant can be replaced in whole or in part as necessary. Furthermore, in the upper region of the supply container above the partition 20 there is a discharge valve 30 for any cooling liquid which collects in the blow air chamber 25. Furthermore, a compressed-air line 31 from an air compressor (not shown) communicates through valve 32 with the blowing-air conduit 19 described above. On the manifold 11a there is provided another valve 33 which is connected with the corresponding channels or passages 15 and 18 both of the blowing-air conduit 19 and of the coolant conduit 16 for venting the interior of the article to the atmosphere prior to the removal of the hollow articles from the mold. This valve also serves for the removal of moisture from the hollow article and the passages 15, 18. A valve 34 for the temporary closing of the feed path to the blowing and filling mandrel 11 is also provided in the above-described coolant conduit 16 ahead of the manifold 11a. All of these valves are actuated with respect to their time and duration of opening by an electric control device (not shown) by magnets.

Before the manner of operation is described below, it should be pointed out that the apparatus before the commencement of its operation has the position shown in the drawing in which the lower chamber 24 of the storage container 17 is completely filled with cooling water. As soon as a sufficient length of plastic tubing at plasticization heat has emerged from the extruder, the blow-mold halves 10 close around the length of the tubing or parison and the part of the blowing and filling mandrel 11 extending into the parison. The partition 20 in the storage container 17 is in the upper position shown in FIG. 1. The valve 32 is briefly opened so that a blowing pressure passes abruptly into the mold cavity 12 from the compressed air line 31 through the conduit 19 and the channel 18 of the blowing and filling mandrel 11. Under this pressure the wall of the tubing is pressed against the wall of the mold.

The hydraulic drive via the piston rod 23 now moves the partition 20 vertically downward. As a result, the cooling water is forced through the coolant conduit 16 and the closure valve 34 which has been opened in the meantime, as well as the channels 15 connected in the blowing and filling mandrel 11 into the inside of the hollow article. This is effected immediately after the blowing with a pressure higher than the blowing pressure, the blowing air at the same time flowing through the channel 18 of the blowing and filling mandrel 11 and the blowing-air conduit 19 into the upper chamber 25 of the storage container 17.

The inside of the hollow article 14 is flooded rapidly and completely from the bottom to the top, whereupon it is drained in the opposite manner. For this purpose a limit switch (not shown) which responds in the lower dead center position of the partition 20, reverses the hydraulic drive so that the partition moves upwardly again. It again draws the cooling water through the channels 15 out of the hollow article and through the coolant feedline 16 back into the lower chamber 24 of the storage container. The closure valve 34 is thereupon closed.

During this removal of the coolant, the blowing air previously present in the upper chamber 25 of the storage container is again forced through the blowing conduit 19 and the blowing-air channel 18 of the blowing and filling mandrel 11 into the interior of the hollow article. This air assists in the complete emptying of liquid from the hollow article, the channels 15 and 18, and the section of the coolant conduit 16 facing the mandrel up to the valve 34 thereof during the removal of the coolant. Thereupon, the vent valve 33 is opened in order to discharge the air still present under considerable pressure in the hollow article through all the channels 15 and 18. This vented air carries along with it from the hollow article and the channels, any moisture which may still be present, so that the surfaces of the article and passages are substantially dry. The hollow article can then be immediately removed from the mold and a new operation started.

The entire flooding and removal process between the blowing and the removal of the product from the mold takes only a fraction of the previously customary cooling and stand-by time. It is increased, to be sure, upon a considerable increase in the temperature of the coolant. In order to avoid this, it is advisable, at predetermined intervals, or else as controlled by a thermostat, to open briefly the two valves 27 and 29 arranged on the storage container 17, so that a part of the heated coolant is discharged and a corresponding quantity of cold coolant is admitted; the overall temperature of the coolant thereby is lowered. Instead of such a periodic or controlled exchange of coolant, the storage container 17 can have a heat-exchange device known in cooling systems in the region of the lower chamber 24 which contains the coolant. This device can, for instance, be a cooling-tube or evaporator system 28' of a known cooling system 28', whose heat-exchange surfaces can be installed either in the intermediate space of a double container wall, or directly in the free space directly above the container bottom of the chamber 24.

While we have disclosed one embodiment of the present invention, it is to be understood that this embodiment is given by example only and not in a limiting sense.

We claim:

1. An apparatus for manufacturing hollow articles from thermoplastic resin, comprising
   an upright blow mold,
   a blowing and filling mandrel extending upwardly within said blow mold from the bottom to close to the top closure edges of said blow mold,
   said mandrel being formed with inlet and outlet channels communicating with lower and upper regions of the interior of a hollow article to be produced for blowing air and for coolant, respectively,
   cylindrical storage container means having a coolant supply region and an air space region,
   conduit means for said blowing air and for said coolant, respectively, connected over separate paths with said storage container means to the coolant supply region and to said air space region, respectively, and
   a partition of piston shape suspended axially moveably in said container means,
   said partition subdividing said storage container means into a first chamber which contains said coolant and forming said coolant supply region and into a second chamber which receives said blowing air and forming said air space region.

2. The apparatus as set forth in claim 1, further comprising
   a piston rod of a drive unit connected to said partition.

3. The apparatus as set forth in claim 2 wherein said drive unit comprises a hydraulic cylinder.

4. The apparatus as set forth in claim 1, further comprising
   feed pipe means connected to said storage container means communicating with said region of said coolant supply for coolant exchange,
   an inlet valve in said feed pipe means,
   a discharge pipe means separated spacedly from said feed pipe means and connected to said storage container means communicating with said region of said coolant, and
   an outlet valve disposed in said discharge pipe means.

5. An apparatus for manufacturing hollow articles from thermoplastic resin, comprising
   an upright blow mold,
   a blowing and filling mandrel extending upwardly within said blow mold from the bottom to close to the top closure edges of said blow mold,
   said mandrel being formed with inlet and outlet channels communicating with lower and upper regions of the interior of a hollow article to be produced for blowing air and for coolant, respectively,
   cylindrical storage container means having a coolant supply region and an air space region,
   conduit means for said blowing air and for said coolant, respectively, connected over separate paths with said storage container means to the coolant supply region and to said air space region, respectively, and
   a heat-exchange means in said coolant supply region.

6. The apparatus as set forth in claim 5 wherein said heat-exchange means comprises cooling tubes.

7. The apparatus as set forth in claim 5 wherein said heat-exchange means comprises an evaporator.

* * * * *